United States Patent [19]

Kesting

[11] Patent Number: 4,521,663

[45] Date of Patent: Jun. 4, 1985

[54] PROCESS FOR DEPOSIT WELDING AND WEAR RESISTANT COATING ALLOY

[75] Inventor: Marinus C. Kesting, Spijkenisse, Netherlands

[73] Assignee: Swiss Aluminum Ltd., Chippis, Switzerland

[21] Appl. No.: 499,758

[22] PCT Filed: Oct. 28, 1982

[86] PCT No.: PCT/CH82/00114

§ 371 Date: May 16, 1983

§ 102(e) Date: May 16, 1983

[87] PCT Pub. No.: WO83/01588

PCT Pub. Date: May 11, 1983

[51] Int. Cl.$^3$ .................. B23K 9/04; B23K 35/30
[52] U.S. Cl. ................ 219/76.14; 219/76.12; 427/49; 427/319
[58] Field of Search .......... 427/49, 319; 219/76.12, 219/76.14

[56] References Cited

U.S. PATENT DOCUMENTS 3,231,709   1/1966   Foley .................. 219/76.14

FOREIGN PATENT DOCUMENTS 1220702   7/1966   Fed. Rep. of Germany ... 219/76.14
1086597  10/1967   United Kingdom ............ 219/76.12

OTHER PUBLICATIONS

Frumin et al., "Surfacing with Large Diameter Cored Wire", *Autom. Welding (GB)*, vol. 25, pp. 42–46, 6–72.
Cary, H., "The Arc Welding Processes–Using CV Power," *Modern Welding Tech.*, Prentice-Hall, Inc., NJ, 1979, pp. 154–157.

*Primary Examiner*—L. Dewayne Rutledge
*Assistant Examiner*—Debbie Yee
*Attorney, Agent, or Firm*—Bachman and LaPointe

[57] ABSTRACT

Wear resistant coatings of highly alloyed filler metal are deposited on base materials of carbon and manganese bearing ferrous alloys and this, depending on the carbon and manganese content of the base material with or without buffer layer, employing low current levels such that the quotient current level/diameter of filler metal wire lies between 70 and 80 and the corresponding quotient for the buffer layer between 120 and 160.

Selected as filler metal are alloys containing 3.0–4.5% Si, 1.5–2.0% Mn, and C≧5%, preferred is the composition 5.5% C, 12.5% Cr, 2.0% Mn, 4.0% Si, 8.0% Mo, 8.0% Nb, 2.0% W, 1.0% V, 57.0% Fe.

28 Claims, No Drawings

PROCESS FOR DEPOSIT WELDING AND WEAR RESISTANT COATING ALLOY

The invention relates to a process for depositing filler materials on heavily worn surfaces on parts of machines and equipment made of carbon and manganese bearing alloys of iron, in particular such as are employed in the carbon processing industry, especially in the production of electrodes for the fused salt electrolytic production of aluminum by the Hall-Héroult process, in order to protect these against wear, and relates too to a wear resistant alloy.

The preparation of the mass for making electrodes, in particular anodes for the fused salt electrolytic production of aluminum via the Hall-Héroult process, involves large amounts of carbonaceous material such as, for example, various types of coke, anode butts, tar, and pitch binder being transported, broken, ground-down, classified and mixed. The equipment employed for this e.g. crushers, grinding mills, mixers, transporting equipment etc. are subject to intensive wear, which is countered, sometimes via very different methods and measures.

In the case of machine and equipment parts made of ferrous materials, flame spraying and cladding with ceramic materials is known, as well as the deposition of wear resistant materials by means of electric arc welding.

One of the best known methods for preventing premature fracture of highly mechanically stressed parts is the application of composite layers, in particular deposit welding of hard materials on a tough base material. In each case it is necessary to adapt the composition of the protective layer for each particular application. In this connection the type of physical action such as abrasion and/or disruption, adhesion and chemical properties—in particular with respect to tribochemical reactions—of the material causing the wear, and especially the operating temperature, are all of importance.

A detailed description of the state of the art of wear prevention technology is presented in Aufbereitungs-Technik No. 10, 1979—the method of deposit welding in particular is dealt with on pages 562-565.

Deposit welding is a protective measure in which a so-called buffer layer is deposited first on the ferrous base material—for which purpose e.g. tubular electrode rods or wire about 3 mm in diameter are employed with a welding current of 300–350 ampere. The actual wear resistant coating is deposited on the buffer layer.

In the carbon processing industry, in particular for the manufacture of electrodes for aluminum production, the equipment used for processing carbon in the form of petroleum coke, pitch coke and anthracite and for comminuting or crushing carbonaceous blocks etc. made from the above mentioned raw materials and pitch and tar type binders, is subjected to wear preventive measures using the above mentioned state of the art of deposit welding, for example for base material made of ferrous alloys containing carbon and manganese, and making use of filler rods of the following composition:

$C \approx 5.5\%$
$Cr \approx 20.5\text{-}23.0\%$
$Mn \approx 0.5\%$
$Si \approx 0.5\%$
$Mo \approx 6.0\text{-}8.0\%$
$Nb \approx 6.0\text{-}8.0\%$
$W \approx 2.0\%$
$V \approx 1.0\%$
$Fe = \text{remainder}$ (Here and all the subsequently mentioned percentages signify weight percentage).

With this commercially available additive (e.g. from Kestra Schweisstechnik GmbH & Co. KG, 404 Neuss, West Germany) a hardness of 59-64 Rockwell C is achieved at ambient temperatures or 40-44 Rockwell C at a working temperature of 600° C. Using this or a similar material and suitable welding equipment a wear resistant layer can be produced with good adhesion between the substrate material and the protective layer.

The reduction in wear produced by the deposited layer is however not adequate in practice. Under continuous operating conditions—as is normal in the industry in question—the wear resistant layer is in fact quickly worn away. This makes it necessary to renew the protective coating after only a few weeks, which leads to high maintenance costs and, due to the undesired down-time of the equipment, to high operating costs.

The object of the present invention is to improve the wear resistance of machine and equipment parts made of carbon and manganese containing ferrous alloys, in particular equipment used in the carbon processing industry mainly for manufacturing electrodes for aluminum production i.e. to increase the useful service life of the said equipment.

The inventor set out to find practical solutions which can be employed not only by specialists but in production within only a short time and successfully so by the general maintenance crews. The financial outlay was, however, to be comparable with that for the state of the art practice. These conditions are necessary as, otherwise, one could consider high technology methods which are in fact not used in practice as they incur large costs due to the necessary down-time of the machine.

The solution to the above objective can come both from the process side and from the material side.

The object is solved by way of the invention on the one hand using an additive material which according to the state of the art is acknowledged as providing good wear resistance for the application in question e.g. the above mentioned alloy, and is so by deposit welding with a solid wire using direct current in the normal ambient conditions i.e. without an inert gas atmosphere, and selecting the welding current in accordance with the diameter of the filler material such that the quotient $S = \text{current/diameter}$ (ampere/mm) lies in the range 70-80, preferably 75.

If necessary, when employing a buffer layer, the quotient P i.e. P=current to deposit the buffer layer/wire diameter (ampere/mm), would lie between 120 and 160, preferably double the value of S.

It is advantageous to employ additive material of the same composition both for the buffer layer and for the wear resistant layer. A further advantage is obtained if the process according to the invention is carried out in the following manner, depending on the carbon and manganese content of the base material:

1. Carbon bearing base material with a carbon content up to 0.22% at most and a manganese content greater than/equal to 5 times the carbon content is provided with a wear-resistant layer without a buffer layer.
2. Base material with a carbon content over 0.22% and a manganese content greater than/equal to 5 times the carbon content is (a) in cases where pre-heating is possible, in particular to about 200°–400° C., preferably 180°–250° C., pre-heated and the wear resistant layer deposit welded onto the base material without provision of a buffer layer, (b) in cases where pre-heating is not possible, provided with a buffer layer, and the final wear resistant layer deposit welded on the still hot buffer layer at about 350° C.

3. Base material with a carbon content greater than/equal to 0.22% and a manganese content of less than 5 times the carbon content is given a buffer layer, cooled to room temperature, and the wear resistant layer deposit welded on top of the buffer layer.

In cases 1 and 3 the protective layer must be deposited at the lowest temperature at which this is possible i.e. if possible at temperature below 180° C. This can take place e.g. by employing the following measures, individually or in combination:

Extracting heat by clamping the part between metal blocks which are efficient thermal conductors.

Intermittent deposition of the wear resistant layer so that the weld region is repeatedly given time to cool down again (by consecutive treatment of a given number of parts this way there is hardly any loss of time).

Pulsed welding with a pulse frequency of approximately 2.5 pulses/sec.

The effect of the process according to the invention is increased substantially by proper choice of the welding material dimensions and the welding current. Choosing the smallest possible wire diameter is particularly helpful towards obtaining the above mentioned, favoured low temperatures. Diameters of merely 1.6 mm—possibly the smallest diameter in which high alloy welding wire can be made today—are suitable and require the lowest current.

Diameters of about 2.4 mm have been found particularly suitable both with respect to handling and the results obtained. In all cases, using the process according to the invention the welding current employed to deposit the wear resistant layer is lower than is employed by the state of the art methods. It is also much below the level of current given in the instructions supplied by the manufacturer of the additive material.

In order to be able to maintain the low level of welding current the power source must feature a rectifier with a flat voltage characteristic.

The part to be provided with the wear resistant layer must be cleaned first to remove any impurities. Particular attention is to be given to intensive cleaning to remove adherent carbon bearing products as, if these are not properly removed, they will increase the carbon content at the surface of the base material thus creating different welding conditions. Suitable for cleaning according to the invention are reducing gases e.g. flames with a slight excess of propane; this also allows the part to be heated to about 300° C. The cleaning is to be continued until complete gasification of the decomposition products has occured. If appropriate, the normal mechanical methods of cleaning e.g. sand blasting, are carried out to remove any adherent decomposition product residue.

In attempting to reach the set objective from the material side it was found that a silicon content of the order of 3–4.5%, in particular 4–4.5%, in the alloy used for the wear resistant layer produced a surprising increase in the service life of the deposited layer. Furthermore it was found that a further increase in service life could be obtained if in addition the manganese content lies in the range 1.5–2%. The effect of the above mentioned silicon or silicon and manganese content is particularly advantageous if at the same time the carbon content is of the order of larger or equal to 5.5%.

It was possible to obtain a further increase in service life by carrying out the process according to the invention with additive materials which contain the above mentioned elements, individually or successfully in combination in the above mentioned concentrations.

In accordance with the invention a welding alloy within the following composition range offers excellent wear resistance:

C = 5.5 – 6.5%
Cr = 12.0 – 13.0%
Mn = 1.5 – 2.0%
Si = 3.5 – 4.5%
Mo = 7.0 – 8.0%
Nb = 7.0 – 8.0%
W = 1.5 – 2.0%
V = 1.0 – 1.5%
Fe = 61.0 – 54.5% the alloy composition:

C = 5.5%
Cr = 12.5%
Mn = 2.0%
Si = 4.0%
Mo = 8.0%
Nb = 8.0%
W = 2.0%
V = 1.0%
Fe = 57.0% featuring preferred wear reducing properties.

The listed composition limits are due to fluctuations in production. The use of such an alloy is recommended especially at operating temperatures up to 800° C., and where the reduced self-polishing effect typical of these alloys can be accepted.

The process according to the invention, employed using the additive filler metal alloy of the invention, provides an optimal wear resistant coating for machine and equipment parts made of carbon and manganese bearing ferrous materials, in particular such as are finding application in the carbon processing industry.

The wear resistant layers produced in accordance with the invention using the alloy of the invention are not as hard as those prepared by the normal prescribed method of preparation. If therefore the last of the above mentioned filler metal compositions is deposited by the conventional method it will have a hardness of the order of 60 HRC and more; prepared by the method according to the invention it will reach a hardness of only ca. 50 HRC. Furthermore, as a result of the method of deposition according to the invention, the weld-deposited layer of alloy of the invention looks inferior in appearance i.e. non-uniform and giving the impression that it is hardly bonded to the base material. In practice, however, it is found that the bonding is adequate; no loosening or spalling of the layer occurs and the wear-resistant property of the layer is not adversely affected by melting of the base material.

Both the process and alloy according to the invention are so advantageous that it is not absolutely necessary to manufacture the part subject to wear out of a highly alloyed base material. It is sufficient to manufacture the part out of an inexpensive ferrous alloy and to provide this with a protective wear-resistant layer by means of the process according to the invention using a known additive material, or more usefully using the alloy according to the invention.

The invention is explained further by way of a number of comparative examples.

EXAMPLE 1

The wear occurring in a hammer mill when breaking up petroleum coke and anode butts is mainly due to impact and shear effects.

At a coke throughput of 5 t per hour the original hammers—made of C 35 steel containing 0.35% carbon and 0.35% manganese, hardened to a depth of 1 mm—having a hole 50 mm in diameter, and each measuring 200 mm long, 100 mm broad, 30 mm thick and weighing 4.3 kg, were so worn after 240 hours that they could not be used further. The average weight of the hammers had been reduced to 2.4 kg.

(a) A hammer of the same kind but not hardened and ground down 5 mm on each of the two long sides and on the front face (so that the head measured 195 mm long, 90 mm broad, and 30 mm thick) was provided on the front face and on half of both long faces with a wear resistant layer made of an additive material F-EH Cr 65 from the Company Kestra the composition of which material corresponds approximately to that of the alloy mentioned on page 4 and such that as a result the hammer was made up again to its original weight. The metal layer was deposited from a 2.4 mm diameter wire in accordance with the instructions of the manufacturer of the wire viz. using a current of 250 ampere which represents therefore a quotient S of 104. After 2000 hours of service at a coke throughput of 5 t per hour, the weight of the hammer had been reduced from its original 4.3 kg to 3.1 kg, only a small fraction of the weight loss being due to wear on the unprotected part of the hammer.

(b) A hammer of the same kind was given the same wear resistant coating as in the previous example, but this time using the process according to the invention. The buffer layer and the actual wear resistant layer were made out of the same wire material, 2.4 mm in diameter. The buffer layer was deposited with a welding current of 360 ampere, and the wear resistant layer—after cooling the workpiece—with a current of 180 ampere, which represents a quotient P of 150 and quotient S of 75. After 2000 hours of service under the same throughput conditions as in (a) the weight of the hammer fell from its original 4.3 kg to 3.5 kg. The service life of the hammer had been considerably improved over that used in example (a).

EXAMPLE 2

(a) A hammer of the same mass as in example 1 and for the same purpose, but made of normal steel containing 0.12% carbon and 0.7% manganese was provided on the same areas as above with a 5 mm thick wear resistant layer of filler material F-EH Cr 65 from the Company Kestra following the instructions of the manufacturer i.e. using a 2.4 mm wire and 300 ampere welding current, which represents a quotient S of 125. After 2000 hours of operation under the same throughput conditions as in example 1, the weight of the hammer had been reduced from the original 4.3 to 3.3 kg.

(b) Using the same kind of hammer and the same filler material as in (a) a 5 mm thick layer of filler material was deposited following the process according to the invention at a current of only 175 ampere, which represents a quotient S of 73. After 2000 hours of operation under the same throughput conditions as in the previous examples, the weight of the hammer fell to only 3.7 kg, which represents a considerable improvement in servce life over the previous example.

(c) The hammer type and procedure were the same as in example (b). Employed, however, was the filler material composition according to the invention viz., C=6.5%, Cr=13%, Mn=2%, Si=4.5%, Mo=8%, Nb=8%, W=2%, V=1.5%, Fe=54.5%. After 2000 hours of operation the hammer still had its original shape; with the naked eye almost no signs of wear were to be seen. The weight loss which was practically due solely to wear on the unprotected part of the hammer amounted to only 100 g. It was possible to continue using the hammer without having to service it in any way.

EXAMPLE 3

Coke kneaders for anode manufacture in the aluminum industry are employed for intimate mixing of coke containing masses at temperatures of 250°-280° C. The kneader paddles mounted on a shaft are in the original condition made of steel containing 0.46% carbon and 0.7% manganese. The same material is also employed for the kneader teeth which are situated on tube-shaped plates of high strength steel. The original high strength steel plates are made of type 120 steel Mn 12 which contains 1.2% carbon and 12% manganese.

In their original form and operating under normal production conditions, the paddles and teeth are totally worn away after 1500 hours of service; the whole material is so worn away in fact that the kneader can no longer function. The high strength steel plates last somewhat longer. After 1800 hours of service these are also worn away and compltely unusable. Repairs require 2 days of down time as the plates, paddles and teeth have to be completely replaced—which makes it necessary to take out the shaft.

(a) A wear resistant coating of type F filler metal(EH Cr 65 supplied as 2.4 mm diameter wire by the company Kestra) was deposited on high strength steel plate, according to instruction at 300 ampere, i.e. giving a quotient S of 125; after 9000 hours of service this coating had been completely removed. Some of the plates exhibited holes in places and had to be replaced; with the others it was possible to provide new protective coatings by weld deposition in situ.

A similar wear resistant layer was deposited in the same manner on a paddle. After 9000 hours of service, the paddle had been worn down to the extent that recoating was necessary.

(b) Plates, paddles and teeth were coated with a 5 mm thick layer of filler metal type F - EH Cr 65 from the company Kestra using the process according to the invention. The filler metal used was 1.6 mm in diameter; the applied current was direct current supplied from a rectifier with a flat voltage characteristic. In all cases a buffer layer, 3 mm thick, was deposited first at 250 A i.e. giviing a quotient P of 156. In the case of the plates a wear resistant coating of the same filler metal was deposited on top of the still warm buffer layer—a temperature of 377° C. was measured by means of a contact thermometer at the start of deposition of the second layer. With the paddles and teeth the protective layer was deposited after the parts had cooled again to room temperature. In all cases of deposition of the second layer the current employed was 125 A which gives a quotient S of 78=0.5 P. By working successively on a fixed number of paddles and teeth it was possible to prevent the parts from becoming overheated. After 9000 hours of service the wear resistant coating still covered all parts completely. Only after 12000 hours of service was it possible to detect local wear of the protective layer on the plates. The paddles after 12000 hours of service appeared to be in about the same condition as the paddles in example (a) after 9000 hours. The teeth were likewise worn after 12000 hours of service. However in this condition it was possible to give both the paddles and the teeth a new wear resistant coating—for which purpose the parts, in accordance with the invention, were cleaned first with a flame containing an excess of propane. It was not necessary to dismantle the shaft.

(c) Plates, paddles and teeth were treated as in the previous exaple (b), however with the difference that the filler material according to the invention of composition C=5.5%, Cr=12.5%, Mn=2.0%, Si=4.0%, Mo=8.0%, Nb=8.0%, W=2.0%, V=1.0%, Fe=57.0% was employed. On checking the parts after 9000 12000 hours of service there was practically no wear found on any of the parts. Only after 160000 hours of service was any wear observed.

However, the wear resistant layer had not been penetrated anywhere, so that it would have been possible to continue to use these parts. As a preventive measure, however, a new wear resistant layer was put down, but without a buffer layer.

By employing the process according to the invention and the filler metal according to the invention it was possible to reduce the outlay for maintenance—compared with example (a)—about 50% with respect to time, and even 65% with respect to personnel.

What is claimed is:

1. Process for depositing wear resistant, protective coatings of highly alloyed ferrous filler metals on base materials of carbon and manganese containing ferrous alloys which find application in particular in the carbon processing industry which comprises providing a base material having a carbon content up to a maximum of 0.22% and a manganese content larger than or equal to 5 times the carbon content, deposit welding directly on said base material using direct current in the ambient atmosphere with a wire or rod shaped filler metal, and selecting the strength of the current according to the diameter of the filler metal wire such that the quotient S wherein S=current/diameter (ampere/mm) is in the range 70-80.

2. Process according to claim 1 wherein a buffer layer is first deposit welded on said base material provided that the quotient P wherein P=current to deposit the buffer layer/wire diameter (amperes/mm) is 120 to 160.

3. Process according to claim 1 wherein the quotient S is 75.

4. Process according to claim 2 wherein the quotient P is double the value of S.

5. Process according to claim 2 wherein a filler material of the same chemical composition is employed for the buffer layer and for the wear resistant coating.

6. Process according to claim 1 wherein the deposition of the wear resistant layer is intermittent.

7. Process accordng to claim 1 wherein the surface of the base material is cleaned with hot reducing gases and the deposit welding takes place only after cooling.

8. Process according to claim 1 wherein the alloy used for the wear resistant layer has a silicon content of 3-4.5%, a manganese content of 1.5-2% and a carbon content equal to or larger than 5.5%.

9. Process for depositing wear resistant, protective coatings of highly alloyed ferrous fillermetals on base materials of carbon and manganese cotaining ferrous alloys which find application in particular in the carbon processing industry which comprises providing a base material having a carbon content over 0.22% and a manganese content larger than or equal to 5 times the carbon content, pre-heating the base material to about 180°-400° C., deposit welding directly on said base material at said temperature direct current in the ambient atmosphere with a wire or rod shaped filler metal, and selecting the strength of the current according to the diameter of the filler metal wire such that the quotient S wherein S=current/diameter (ampere/mm) is in the range 70-80.

10. Process according to claim 9 wherein the quotient S is 75.

11. Process according to claim 9 wherein the deposition of the wear resistant layer is intermittent.

12. Process according to claim 9 wherein the surfaces of the base material is cleaned with hot reducing gases and the deposit welding takes place only after cooling.

13. Process according to claim 9 wherein the alloy used for the wear resistant layer has a silicon content of 3-4.5%, a manganese content of 1.5-2% and a carbon content equal to or larger than 5.5%.

14. Process for depositing wear resistant, protective coatings of highly alloyed ferrous filler metals on base materials of carbon and manganese containing ferrous alloys which find application in particular in the carbon processing industry which comprises providing a base material having a carbon content over 0.22% and a manganese content larger than or equal to 5 times the carbon content, deposit welding on said base material using direct current in the ambient atmosphere with a wire or rod shaped buffer material at an elevated temperature wherein the strength of the current is selected according to the diameter of the buffer material wire such that the quotient P wherein P=current to deposit the buffer layer/diameter (amperes/mm) is 120 to 160, deposit welding a wire or rod shaped filler metal on said buffer layer while said buffer layer is still hot using direct current in the ambient atmosphere, and selecting the strength of the current according to the diameter of the filler metal wire such that the quotient S wherein S=current/diameter (ampere/mm) is in the range 70-80.

15. Process according to claim 14 wherein the quotient S is 75.

16. Process according to claim 14 wherein the quotient P is double the value of S.

17. Process according to claim 14 wherein a filler material of the same chemical composition is employed for the buffer layer and for the wear resistant coating.

18. Process according to claim 14 wherein said buffer layer is deposited at around 350° C.

19. Process according to claim 14 wherein the deposition of the wear resistant layer is intermittent.

20. Process according to claim 14 wherein the surface of the base material is cleaned with hot reducing gases and the deposit welding takes place only after cooling.

21. Process according to claim 14 wherein the alloy used for the wear resistant layer has a silicon content of 3-4.5%, a manganese content of 1.5-2% and a carbon content equal to or larger than 5.5%.

22. Process for depositing wear resistant, protective coatings of highly alloyed ferrous filler metals on base materials of carbon and manganese containing ferrous alloys which find application in particular in the carbon processing industry which comprises providing a base material having a carbon content over 0.22% and a manganese content less than 5 times the carbon content, deposit welding on said base material using direct current in the ambient atmosphere with a wire or rod shaped buffer material at an elevated temperature wherein the strength of the current is selected according to the diameter of the buffer material wire such that the quotient P wherein P=current to deposit the buffer layer/diameter (amperes/mm) is 120 to 160, cooling the buffer layer to room temperature, deposit welding a wire or rod shaped filler metal on said buffer layer using direct current in the ambient atmosphere, and selecting the strength of the current according to the diameter of the filler metal wire such that the quotient S wherein S=current/diameter (ampere/mm) is in the range 70–80.

23. Process according to claim 22 wherein the quotient S is 75.

24. Process according to claim 22 wherein the quotient P is double the value of S.

25. Process according to claim 22 wherein a filler material of the same chemical composition is employed for the buffer layer and for the wear resistant coating.

26. Process according to claim 22 wherein the deposition of the wear resistant layer is intermittent.

27. Process according to claim 22 wherein the surface of the base material is cleaned with hot reducing gases and the deposit welding takes place only after cooling.

28. Process according to claim 22 wherein the alloy used for the wear resistant layer has a silicon content of 3–4.5%, a manganese content of 1.5–2% and a carbon content equal to or larger than 5.5%.

* * * * *